US011926905B2

(12) United States Patent
Delfan-Azari

(10) Patent No.: US 11,926,905 B2
(45) Date of Patent: Mar. 12, 2024

(54) METHOD OF REMOVING A CERAMIC COATING FROM A CERAMIC COATED METALLIC ARTICLE

(71) Applicant: ROLLS-ROYCE plc, London (GB)

(72) Inventor: Mehrzad Delfan-Azari, Bristol (GB)

(73) Assignee: Rolls-Royce plc

( * ) Notice: Subject to any disclaimer, the term of this patent is extended or adjusted under 35 U.S.C. 154(b) by 862 days.

(21) Appl. No.: 16/803,055

(22) Filed: Feb. 27, 2020

(65) Prior Publication Data

US 2020/0291532 A1 Sep. 17, 2020

(30) Foreign Application Priority Data

Mar. 14, 2019 (GB) ..................................... 1903484

(51) Int. Cl.
*C23G 1/14* (2006.01)
*B08B 3/02* (2006.01)
(Continued)

(52) U.S. Cl.
CPC ................ *C23G 1/14* (2013.01); *B08B 3/024* (2013.01); *B24C 5/04* (2013.01); *B24C 7/0076* (2013.01);
(Continued)

(58) Field of Classification Search
CPC ........ F01D 5/288; F01D 5/005; F01D 25/002; F05D 2230/90; F05D 2230/80;
(Continued)

(56) References Cited

U.S. PATENT DOCUMENTS 4,552,198 A 11/1985 Mills et al.
5,167,721 A 12/1992 McComas et al.
(Continued)

FOREIGN PATENT DOCUMENTS

CN 106269648 * 1/2017
EP 0783044 7/1997
(Continued)

OTHER PUBLICATIONS

Great Britain search report dated Sep. 12, 2019, issued in GB Patent Application No. 1903484.2.
(Continued)

*Primary Examiner* — Natasha N Campbell
*Assistant Examiner* — Richard Z. Zhang
(74) *Attorney, Agent, or Firm* — Barnes & Thornburg LLP

(57) ABSTRACT

A method of removing a ceramic coating from a ceramic coated metallic article without damaging the metallic bond coating, the metallic article having a first and second portions, each of the portions comprising a metallic bond coating and a ceramic coating on the metallic bond coating, the ceramic coating on the second portion being less porous than the ceramic coating on the first portion. The method comprises the steps of a) immersing the ceramic coated metallic article in a caustic solution; b) maintaining the ceramic coated metallic article in the caustic solution at atmospheric pressure for a predetermined time period and at a predetermined temperature; c) removing the ceramic coated metallic article from the caustic solution; d) rinsing the ceramic coated metallic article in water at ambient temperature; e) water jet blasting the first portion of the metallic article to remove the ceramic coating; and f) water jet blasting the second portion of the metallic article to remove the ceramic coating.

19 Claims, 5 Drawing Sheets

(51) Int. Cl.
*B24C 5/04* (2006.01)
*B24C 7/00* (2006.01)
*F01D 5/28* (2006.01)

(52) U.S. Cl.
CPC .......... *F01D 5/288* (2013.01); *F05D 2230/10* (2013.01); *F05D 2230/90* (2013.01); *F05D 2300/611* (2013.01)

(58) Field of Classification Search
CPC .... F05D 2230/10; B64F 5/30; B23P 2700/06; C23C 4/185; C23C 28/3455; C23G 1/00–36; C23G 5/00–06; B08B 3/00–14; B08B 9/00–46; B24C 1/00–11/005
See application file for complete search history.

(56) References Cited

U.S. PATENT DOCUMENTS

| | | | | |
|---|---|---|---|---|
| 5,643,474 | A | 7/1997 | Sangeeta | |
| 5,679,270 | A | 10/1997 | Thornton et al. | |
| 5,972,424 | A | 10/1999 | Draghi et al. | |
| 6,004,620 | A * | 12/1999 | Camm | C23C 4/12 427/454 |
| 6,042,880 | A | 3/2000 | Rigney et al. | |
| 6,099,655 | A | 8/2000 | Farr et al. | |
| 6,132,520 | A | 10/2000 | Schilbe et al. | |
| 6,146,692 | A | 11/2000 | Sangeeta et al. | |
| 6,158,957 | A | 12/2000 | Marcin et al. | |
| 6,210,488 | B1 | 4/2001 | Bruce | |
| 6,221,512 | B1 | 4/2001 | Rickerby | |
| 6,544,346 | B1 * | 4/2003 | Grossklaus, Jr. | C23C 10/02 134/29 |
| 6,905,396 | B1 * | 6/2005 | Miller | C23C 4/02 451/75 |
| 2001/0009247 | A1 | 7/2001 | Brooks | |
| 2004/0195380 | A1 * | 10/2004 | Wall | B05B 3/02 239/451 |
| 2004/0247789 | A1 | 12/2004 | Boucard et al. | |
| 2004/0256504 | A1 * | 12/2004 | Segrest | B08B 3/02 241/1 |
| 2005/0127039 | A1 * | 6/2005 | Rosenzweig | C23C 10/18 216/102 |
| 2008/0006301 | A1 | 1/2008 | Garry et al. | |
| 2012/0328445 | A1 | 12/2012 | Ridgeway et al. | |
| 2014/0141276 | A1 * | 5/2014 | Czech | C23C 4/10 427/454 |
| 2015/0114437 | A1 | 4/2015 | Stewart | |
| 2017/0362692 | A1 * | 12/2017 | Wolfe | C23C 10/52 |

FOREIGN PATENT DOCUMENTS

| | | |
|---|---|---|
| EP | 1010776 | 6/2000 |
| EP | 1013798 | 6/2000 |
| EP | 1795629 | 6/2007 |
| EP | 1107867 | 12/2008 |
| EP | 2540976 | 1/2013 |
| EP | 1956116 | 10/2015 |
| JP | H09195067 | * 7/1997 |
| WO | 0006380 | 2/2000 |

OTHER PUBLICATIONS

European Search report dated Mar. 12, 2020, issued in European Patent Application No. 20157364.

* cited by examiner

METHOD OF REMOVING A CERAMIC COATING FROM A CERAMIC COATED METALLIC ARTICLE

CROSS-REFERENCE TO RELATED APPLICATIONS

This specification is based upon and claims the benefit of priority from United Kingdom patent application number GB 1903484.2 filed on Mar. 14th 2019, the entire contents of which are incorporated herein by reference.

BACKGROUND

Technical Field

The present disclosure relates to a method of removing a ceramic coating from a ceramic coated metallic article and in particular relates to a method of removing a ceramic coating from a thermal barrier coated metallic article, e.g. a superalloy article.

Description of the Related Art

Internal combustion engines for example continuous combustion engine e.g. gas turbine engines, reciprocating engines e.g. diesel engines and petrol engines and rotary engines e.g. Wankel engines and turbomachines have thermal barrier coated metallic articles, e.g. ceramic coated metallic articles. Gas turbine engines have ceramic coated turbine blades, turbine vanes, combustion chamber tiles, combustion chamber heat shields and other articles or components. Turbomachines, e.g. steam turbines, may have ceramic coated turbine blades, turbine vanes and other articles or components.

These articles/components are generally metallic, for example comprising nickel based superalloys, cobalt based superalloys or iron based superalloys. Such metallic articles may comprise a single crystal, for example a single crystal nickel based superalloy.

The ceramic coating is generally an yttria-stabilised zirconia coating, but may have alternative stabilising oxides and/or one or more additional oxides to reduce the conductivity of the ceramic coating. The ceramic coating may be deposited by physical vapour deposition, e.g. electron beam physical vapour deposition, to produce a columnar grain ceramic structure in which the columnar grains extend perpendicularly relative to the surface of the metal article. Alternatively, the ceramic coating may be deposited by thermal spraying, e.g. plasma spraying, flame spraying, high velocity oxy-fuel (HVOF) spraying, to produce a lamellae microstructure consisting of flattened splats, a splat morphology, of ceramic. The columnar grain ceramic structure is more porous and less dense than the lamellae microstructure. Columnar grain microstructure bonds to an oxide layer on the metallic bond coating whereas the lamellae microstructure bonds to a rough surface on the metallic bond coating.

The ceramic coated metal articles are provided with a metallic bond coating on the metal article and a ceramic coating on the metallic bond coating. The metallic bond coating is provided to enhance the adherence of the ceramic coating onto the metal article and to provide corrosion resistance and/or oxidation resistance to the metal article. A ceramic coated metal article is manufactured by depositing a bond coating onto the surface of the metal and then depositing a ceramic coating onto the bond coating. The metallic bond coating may be an aluminum containing. The metallic bond coating may be for example a MCrAlY coating, a MCrAl coating, a MAl coating, an aluminide coating, a platinum aluminide coating, a chromium aluminide coating, a platinum chromium aluminide coating, an aluminide silicide coating, a platinum aluminide silicide coating, a chromium aluminide silicide coating or a platinum chromium aluminide silicide coating. The metallic bond coating may be a platinum group metal containing coating.

During the manufacture of ceramic coated metal articles occasionally defects are produced in the ceramic coating resulting in a ceramic coated metal article not falling within acceptable standards for its intended use. These defects may be one or more of lack of coating, thicker coating than required, chipped coating, pits and spits, delamination, staining, contamination and overspray. It is desirable to be able to remove a defective ceramic coating from a ceramic coated metal article so that an acceptable ceramic coating may be re-applied to the metal article. After a period of operation of a ceramic coated article the ceramic coating may become damaged, e.g. part of the ceramic coating have spalled off, and again is not of acceptable standards for its intended use. It is desirable to be able to remove a damaged ceramic coating from a used ceramic coated metal article so that an acceptable ceramic coating may be re-applied to the metal article.

It is known to remove ceramic coatings from ceramic coated metal articles by immersing the ceramic coated article in a caustic solution and/or by water jet blasting. However, these processes do not produce satisfactory results in that they do not fully remove all of the ceramic coating and/or they remove some or all of the metallic bond coating. We have found that the use of a caustic solution is effective in permeating through a ceramic coating with a columnar grain microstructure to weaken an oxide layer between the metallic bond coating and the columnar grain ceramic coating, but the caustic solution is totally ineffective in permeating through a ceramic coating with a lamellae microstructure. We have found that the use of conventional water jet blasting is ineffective in the removal of a ceramic coating with a columnar grain microstructure from the convex side of metallic articles as well as from the inside of cooling apertures and complete removal of the ceramic coating is only possible with repeated water jet blasting but this removes the metallic bond coating or erodes the metallic bond coating and reduces the surface roughness of the metallic bond coating.

If the metallic bond coating is partially removed it is necessary to apply a thin metallic bond coating layer over the remaining metallic bond coating. Applying a thin metallic bond coating layer may result in an overall metallic bond coating which has regions which are deficient of desirable elements, such as aluminum, which is required to form an alumina layer on the metallic bond coating and between the metallic bond coating and the ceramic coating as well as adding expense. Applying a thin metallic bond coating layer may result in an overall metallic bond coating which is dimensionally or compositionally outside of the required limits. If the metallic bond coating is completely removed it is necessary to apply a full thickness metallic bond coating which adds even more expense.

The present disclosure seeks to provide a method of removing a ceramic coating from a ceramic coated metal article which reduces or overcomes the above mentioned problem.

SUMMARY

According to a first aspect there is provided a method of removing a ceramic coating from a ceramic coated metallic article, the metallic article having a first portion and a second portion, the first portion having a metallic bond coating and a ceramic coating on the metallic bond coating and the second portion having a metallic bond coating and a ceramic coating on the metallic bond coating, the ceramic coating on the second portion being less porous than the ceramic coating on the first portion, the method comprising the steps of:

a) immersing the ceramic coated metallic article in a caustic solution, the caustic solution comprising one of potassium hydroxide and sodium hydroxide;

b) maintaining the ceramic coated metallic article in the caustic solution at atmospheric pressure for a predetermined time period and at a predetermined temperature;

c) removing the ceramic coated metallic article from the caustic solution;

d) rinsing the ceramic coated metallic article in water at ambient temperature;

e) water jet blasting the first portion of the ceramic coated metallic article to remove the ceramic coating; and f) water jet blasting the second portion of the ceramic coated metallic article to remove the ceramic coating.

The ceramic coating on the first portion of the ceramic coated metallic article may be a columnar grain ceramic coating. The ceramic coating on the second portion of the ceramic coated metallic article may be a lamellae ceramic coating.

Step f) may be performed after step e).

Steps a) to f) may be performed sequentially.

There may be a step of neutralising the caustic solution with an acidic solution after step d) and before step e). The neutralising of the caustic solution may comprise immersing the in nitric acid solution.

There may be a step of rinsing in water after the neutralising the caustic solution and before step e). The rinsing in water may comprise rinsing in water at ambient temperature and rinsing in water at a temperature of 75° C. to 85° C.

There may be a step of water blasting after the step of rinsing in water after neutralising the caustic solution and before step e) to dislodge any ceramic debris.

There may be a step of rinsing in hot water at a temperature of 75° C. to 85° C. after water blasting to dislodge any ceramic debris and before step e).

Step a) may comprise immersing the ceramic coated metallic article in a caustic solution of 46 to 54% potassium hydroxide or a caustic solution of 46 to 54% sodium hydroxide.

Step b) may comprise maintaining the ceramic coated metallic article in the caustic solution at atmospheric pressure for a time equal to or less than one and a half hours at a temperature equal to or greater than 150° C. and equal to or less than 250° C. to weaken a bond between the ceramic coating and the metallic bond coating on the first portion of the metallic article.

Step b) may comprise maintaining the ceramic coated metallic article in the caustic solution at atmospheric pressure for a time equal to or more than half an hour and equal to or less than one and a half hours at a temperature equal to or greater than 150° C. and equal to or less than 250° C. to weaken a bond between the ceramic coating and the metallic bond coating on the first portion of the metallic article.

Step b) may comprise maintaining the ceramic coated metallic article at atmospheric pressure in the caustic solution for at least one hour at a temperature of 200° C. to 220° C.

Step d) may comprise rinsing the ceramic coated metallic article in water for a minimum of 10 minutes.

Step e) may comprise water jet blasting the first portion of the metallic article by directing water at the ceramic coating from a nozzle at a pressure of 275 to 296 MPa (40,000 to 43,000 psi), arranging the nozzle at a stand-off distance from the ceramic coating of 25 to 35 mm and traversing the nozzle over the first portion of the metallic article at a speed of 4 to 6 mm per second.

Step e) may comprise water jet blasting the first portion of the metallic article by directing water at the ceramic coating from a nozzle at a pressure of 275 to 290 MPa (40,000 to 42,000 psi), arranging the nozzle at a stand-off distance from the ceramic coating of 28 to 32 mm and traversing the nozzle over the first portion of the metallic article at a speed of 4.5 to 5.5 mm per second.

Step e) may comprise water jet blasting the first portion of the metallic article by directing water at the ceramic coating from a nozzle at a pressure of 284.7 MPa (41,300 psi), arranging the nozzle at a stand-off distance from the ceramic coating of 30 mm and traversing the nozzle over the first portion of the metallic article at a speed of 5 mm per second.

Step f) may comprise water jet blasting the second portion of the metallic article by directing water at the ceramic coating from a nozzle at a pressure of 275 to 296 MPa (40,000 to 43,000 psi), arranging the nozzle at a stand-off distance from the ceramic coating of 30 to 40 mm and traversing the nozzle over the second portion of the metallic article at a speed of 5 to 8 mm per second.

Step f) may comprise water jet blasting the second portion of the metallic article by directing water at the ceramic coating from a nozzle at a pressure of 275 to 290 MPa (40,000 to 42,000 psi), arranging the nozzle at a stand-off distance from the ceramic coating of 33 to 37 mm and traversing the nozzle over the second portion of the metallic article at a speed of 6 to 7 mm per second.

Step f) may comprise water jet blasting the second portion of the metallic article by directing water at the ceramic coating from a nozzle at a pressure of 284.7 MPa (41,300 psi), arranging the nozzle at a stand-off distance from the ceramic coating of 35 mm and traversing the nozzle over the second portion of the metallic article at a speed of 6.7 mm per second.

The ceramic coated metallic article may be a superalloy article. The superalloy article may be a nickel based superalloy, a cobalt based superalloy or an iron based superalloy. The ceramic coated metallic article may be a single crystal metallic article.

The ceramic coating may comprise yttria stabilised zirconia. The ceramic coating may comprise zirconia stabilised with ceria, ytterbia or indium. The ceramic coating may comprise zirconia stabilised with yttria and erbia. The ceramic coating may comprise zirconia stabilised with yttria, erbia and gadolinia. The ceramic coating may comprise zirconia stabilised with yttria and gadolinia.

The ceramic coated metallic article may be a turbine blade comprising a root, a shank, a platform and an aerofoil. The ceramic coated metallic article may be a turbine vane comprising a first platform, a second platform and an aerofoil extending between and secured to the first and second platforms. The ceramic coated metallic article may be a turbine vane segment comprising a first platform, a second platform and a plurality of aerofoils, each aerofoil extending between and secured to the first and second platforms. The first portion of the turbine blade may be an aerofoil and the second portion of the turbine blade is a platform. The first portion of the turbine vane may be an aerofoil and the second portion of the turbine vane is the first and second platforms. The first portion of the turbine vane segment may be the plurality of aerofoils and the second portion of the turbine vane segment is the first and second platforms. The, or each, aerofoil has a first edge, a second edge, a concave surface and a convex surface. The first edge may be the leading edge or the trailing edge and the second edge may be the trailing edge or the leading edge. The first platform may be the radially inner platform or the radially outer platform and the second platform may be the radially outer platform or the radially inner platform.

Step e) may comprise traversing the nozzle in a first pass over the concave surface of the aerofoil of the turbine vane from the first edge to the second edge of the aerofoil adjacent to the first platform, traversing the nozzle in a second pass over the concave surface of the aerofoil of the turbine vane from the second edge to the first edge of the aerofoil adjacent to the second platform, traversing the nozzle repeatedly back and forth over the concave surface of the aerofoil of the turbine vane in a direction between the first and second platforms between the first pass and the second pass with the back and forth traverses spaced apart in a direction between the first edge and the second edge of the aerofoil.

Step e) may comprise traversing the nozzle in a first pass over the concave surface of the aerofoil of the turbine vane from the first edge to the second edge of the aerofoil adjacent to the first platform, traversing the nozzle in a second pass over the concave surface of the aerofoil of the turbine vane from the first edge to the second edge of the aerofoil adjacent to the second platform, traversing the nozzle repeatedly back and forth over the concave surface of the aerofoil of the turbine vane in a direction between the first and second platforms between the first pass and the second pass with the back and forth traverses spaced apart in a direction between the first edge and the second edge of the aerofoil.

Step e) may comprise traversing the nozzle in a first pass over the convex surface of the aerofoil of the turbine vane from the first edge to the second edge of the aerofoil adjacent to the first platform, traversing the nozzle in a second pass over the convex surface of the aerofoil of the turbine vane from the second edge to the first edge of the aerofoil adjacent to the second platform, traversing the nozzle repeatedly back and forth over the convex surface of the aerofoil of the turbine vane in a direction between the first and second platforms between the first pass and the second pass with the back and forth traverses spaced apart in a direction between the first edge and the second edge of the aerofoil.

Step e) may comprise traversing the nozzle in a first pass over the convex surface of the aerofoil of the turbine vane from the first edge to the second edge of the aerofoil adjacent to the first platform, traversing the nozzle in a second pass over the convex surface of the aerofoil of the turbine vane from the first edge to the second edge of the aerofoil adjacent to the second platform, traversing the nozzle repeatedly back and forth over the convex surface of the aerofoil of the turbine vane in a direction between the first and second platforms between the first pass and the second pass with the back and forth traverses spaced apart in a direction between the first edge and the second edge of the aerofoil.

Step e) may comprise traversing the nozzle in a first pass over the concave surface of each of the aerofoils of the turbine vane segment from the second edge to the first edge of each aerofoil adjacent to the first platform, traversing the nozzle in a second pass over the concave surface of each aerofoil of the turbine vane segment from the second edge to the first edge of each aerofoil adjacent to the second platform, traversing the nozzle repeatedly back and forth over the concave surface of each aerofoil of the turbine vane segment in a direction between the first and second platforms between the first pass and the second pass with the back and forth traverses spaced apart in a direction between the first edge and the second edge of each aerofoil.

Step e) may comprise traversing the nozzle in a first pass over the concave surface of each of the aerofoils of the turbine vane segment from the second edge to the first edge of each aerofoil adjacent to the first platform, traversing the nozzle in a second pass over the concave surface of each aerofoil of the turbine vane segment from the first edge to the second edge of each aerofoil adjacent to the second platform, traversing the nozzle repeatedly back and forth over the concave surface of each aerofoil of the turbine vane segment in a direction between the first and second platforms between the first pass and the second pass with the back and forth traverses spaced apart in a direction between the first edge and the second edge of each aerofoil.

Step e) may comprise traversing the nozzle in a first pass over the convex surface of each aerofoil of the turbine vane segment from the second edge to the first edge of each aerofoil adjacent to the first platform, traversing the nozzle in a second pass over the convex surface of each aerofoil of the turbine vane segment from the second edge to the first edge of each aerofoil adjacent to the second platform, traversing the nozzle repeatedly back and forth over the convex surface of each aerofoil of the turbine vane segment in a direction between the first and second platforms between the first pass and the second pass with the back and forth traverses spaced apart in a direction between the first edge and the second edge of each aerofoil.

Step e) may comprise traversing the nozzle in a first pass over the convex surface of each aerofoil of the turbine vane segment from the second edge to the first edge of each aerofoil adjacent to the first platform, traversing the nozzle in a second pass over the convex surface of each aerofoil of the turbine vane segment from the first edge to the second edge of each aerofoil adjacent to the second platform, traversing the nozzle repeatedly back and forth over the convex surface of each aerofoil of the turbine vane segment in a direction between the first and second platforms between the first pass and the second pass with the back and forth traverses spaced apart in a direction between the first edge and the second edge of each aerofoil.

Step f) may comprise traversing the nozzle in a first pass over the surface of the radially outer platform of the turbine vane segment spaced from the convex surface of each aerofoil in a general direction from the leading edge to the trailing edge of each aerofoil.

Step f) may comprise a second pass over the surface of the radially outer platform of the turbine vane segment parallel to an upstream end of the radially outer platform spaced from the leading edge of a first aerofoil, then back and forth between the concave surface of the first aerofoil and the convex surface of the second aerofoil, then parallel to an upstream end of the radially outer platform spaced from the leading edge of the second aerofoil and then from the leading edge towards the trailing edge of the second aerofoil but spaced from the concave surface of the second aerofoil.

Step f) may comprise a third pass over the surface of the radially outer platform of the turbine vane segment from the trailing edge towards the leading edge of the first aerofoil but spaced from the concave surface of the first aerofoil, then parallel to the upstream end of the radially outer platform spaced from the leading edge of the first aerofoil, then around the leading edge of the first aerofoil and back and forth between the convex surface of the first aerofoil and the concave surface of the second aerofoil, then parallel to the upstream end of the radially inner platform adjacent to but spaced from the leading edge of the second aerofoil.

Step f) may comprise a fourth pass over the surface of the radially inner platform of the turbine vane segment from the trailing edge of the first aerofoil towards the leading edge of the first aerofoil but spaced from the convex surface of the first aerofoil, around and spaced from the trailing edge of the second aerofoil and from the trailing edge of the second aerofoil towards the leading edge of the second aerofoil but spaced from the convex surface of the second aerofoil.

The nozzle may be rotated at 1000 rpm+/−100 rpm and the nozzle may have a diameter of 0.58 mm. The passes of the water jet may be arranged to overlap by 25%. The nozzle may be arranged to direct the water jet at any cooling apertures in the metallic article to remove ceramic coating therefrom.

The metallic bond coating on the first portion and the metallic bond coating on the second portion are different. The metallic bond coating on the first portion and the metallic bond coating on the second portion may be the same. The metallic bond coating on the first portion may comprise a platinum-group metal. The metallic bond coating on the second portion may be an overlay coating. The overlay coating may comprise a MCrAlY coating where M is one or more of nickel, cobalt and iron, Cr is chromium, Al is aluminum and Y is one or more of yttrium, ytterbium and lanthanum. The metallic bond coating on the second portion may comprise a layer of platinum-group metal between the second portion of the metallic article and the overlay coating. The bond coating may be deposited by plasma spraying or physical vapour deposition. The metallic bond coating on the second portion may be an aluminide coating. The aluminide coating may be a simple aluminide coating, a platinum aluminide coating, a chromium aluminide coating, a platinum chromium aluminide coating, an aluminide silicide coating, a platinum aluminide silicide coating, a chromium aluminide silicide coating or a platinum chromium aluminide silicide coating. The aluminide coating may be deposited by pack aluminising, out of pack aluminising or slurry aluminising.

The method may comprise directing water droplets with a diameter of 17 to 18 μm onto the ceramic coating. The method may comprise directing water droplets with a diameter of 17.4 onto the ceramic coating. The method may comprise directing water droplets with a velocity of 650 $ms^{-1}$ to 690 $ms^{-1}$ onto the ceramic coating. The method may comprise directing water droplets with a velocity of 660 $ms^{-1}$ to 680 $ms^{-1}$ onto the ceramic coating. The method may comprise directing water droplets with a velocity of 667 $ms^{-1}$ onto the ceramic coating. The method comprising directing water droplets onto the ceramic coating to produce an impact pressure of 1.69 GPa.

The nozzle may be arranged on a 6 axis robot.

According to a second aspect there is provided a method of removing a ceramic coating from a ceramic coated metallic article, the metallic article having a first portion and a second portion, the first portion having a metallic bond coating and a columnar grain ceramic coating on the metallic bond coating and the second portion having a metallic bond coating and a ceramic coating on the metallic bond coating, the ceramic coating on the second portion being less porous than the columnar grain ceramic coating on the first portion, the method comprising the steps of:

a) immersing the ceramic coated metallic article in a caustic solution, the caustic solution comprising one of potassium hydroxide and sodium hydroxide, the caustic solution is one of 46 to 54% potassium hydroxide and 46 to 54% sodium hydroxide;

b) maintaining the ceramic coated metallic article in the caustic solution at atmospheric pressure for a time equal to or more than half an hour and equal to or less than one and a half hours at a temperature equal to or greater than 150° C. and equal to or less than 250° C. to weaken a bond between the columnar grain ceramic coating and the metallic bond coating on the first portion of the metallic article;

c) removing the ceramic coated metallic article from the caustic solution;

d) rinsing the ceramic coated metallic article in water at ambient temperature to produce a thermal shock to further weaken the bond between the columnar grain ceramic coating and the metallic bond coating on the first portion of the metallic article;

e) water jet blasting the first portion of the ceramic coated metallic article at a pressure of 275 to 296 MPa to remove the columnar grain ceramic coating; and f) water jet blasting the second portion of the ceramic coated metallic article at a pressure of 275 to 296 MPa to remove the ceramic coating.

Step b) provides sufficient time to allow the caustic solution to penetrate through the columnar grain ceramic coating to weaken an oxide layer between the metallic bond coating and the columnar grain ceramic coating without significant spalling of the columnar grain ceramic coating.

According to a third aspect there is provided a method of removing a ceramic coating from a ceramic coated metallic article, the metallic article having a first portion and a second portion, the first portion having a metallic bond coating and a columnar grain ceramic coating on the metallic bond coating and the second portion having a metallic bond coating and a ceramic coating on the metallic bond coating, the ceramic coating on the second portion being less porous than the columnar grain ceramic coating on the first portion, the method comprising the steps of:

a) immersing the ceramic coated metallic article in a caustic solution, the caustic solution comprising one of potassium hydroxide and sodium hydroxide;
b) maintaining the ceramic coated metallic article in the caustic solution at atmospheric pressure for a predetermined time period and at a predetermined temperature;
c) removing the ceramic coated metallic article from the caustic solution;
d) rinsing the ceramic coated metallic article in water at ambient temperature;
e) water jet blasting the first portion of the ceramic coated metallic article to remove the columnar grain ceramic coating, the water jet blasting comprising directing water droplets with a diameter of 17 to 18 μm with a velocity of 650 $ms^{-1}$ to 690 $ms^{-1}$ onto the columnar grain ceramic coating; and
f) water jet blasting the second portion of the ceramic coated metallic article to remove the ceramic coating, the water jet blasting comprising directing water droplets with a diameter of 17 to 18 μm with a velocity of 650 $ms^{-1}$ to 690 $ms^{-1}$ onto the ceramic coating.

The method may comprise directing water droplets with a diameter of 17.4 onto the ceramic coating. The method may comprise directing water droplets with a velocity of 660 $ms^{-1}$ to 680 $ms^{-1}$ onto the ceramic coating. The method may comprise directing water droplets with a velocity of 667 $ms^{-1}$ onto the ceramic coating. The method comprising directing water droplets onto the ceramic coating to produce an impact pressure of 1.69 GPa.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a “planetary” or “star” gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a “star” gearbox having a ratio in the range of from 3.1 or 3.2 to 3.8. In some arrangements, the gear ratio may be outside these ranges.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIG. 8(*b*) is a schematic diagram illustrating the removal of ceramic coating from a concave surface of each aerofoil of a turbine vane segment.

FIG. 9(*b*) is a schematic diagram illustrating the removal of ceramic coating from a surface of an outer platform adjacent to concave surfaces of aerofoils and between a concave surface of one aerofoil and a convex surface of another aerofoil of a turbine vane segment.

FIG. 9(*c*) is a schematic diagram illustrating the removal of ceramic coating from a surface of an inner platform adjacent to concave surfaces of aerofoils and between a concave surface of one aerofoil and a convex surface of another aerofoil of a turbine vane segment.

FIG. 9(*d*) is a schematic diagram illustrating the removal of ceramic coating from a surface of an inner platform adjacent to convex surfaces of aerofoils of a turbine vane segment.

DETAILED DESCRIPTION

Aspects and embodiments of the present disclosure will now be discussed with reference to the accompanying figures. Further aspects and embodiments will be apparent to those skilled in the art.

Figure 1:
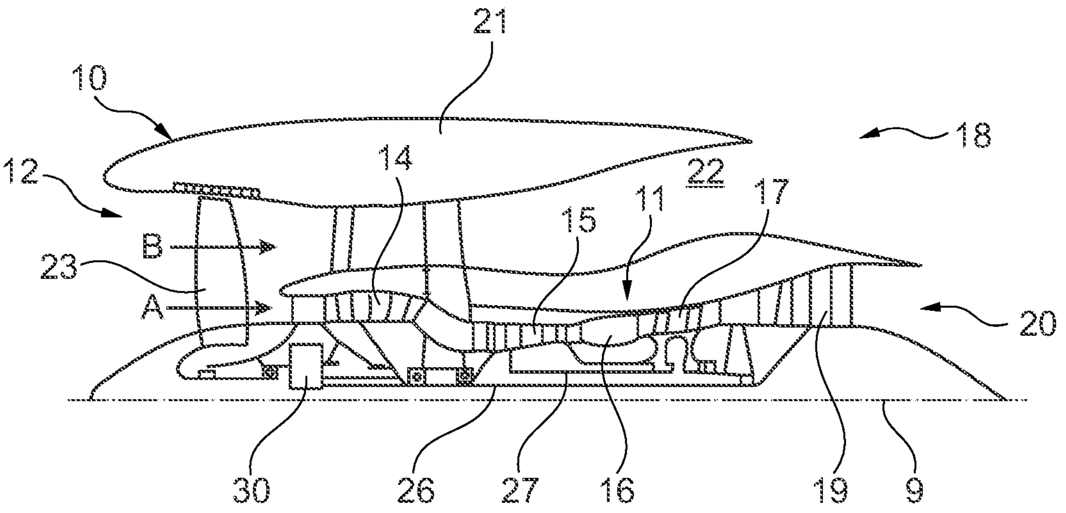
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
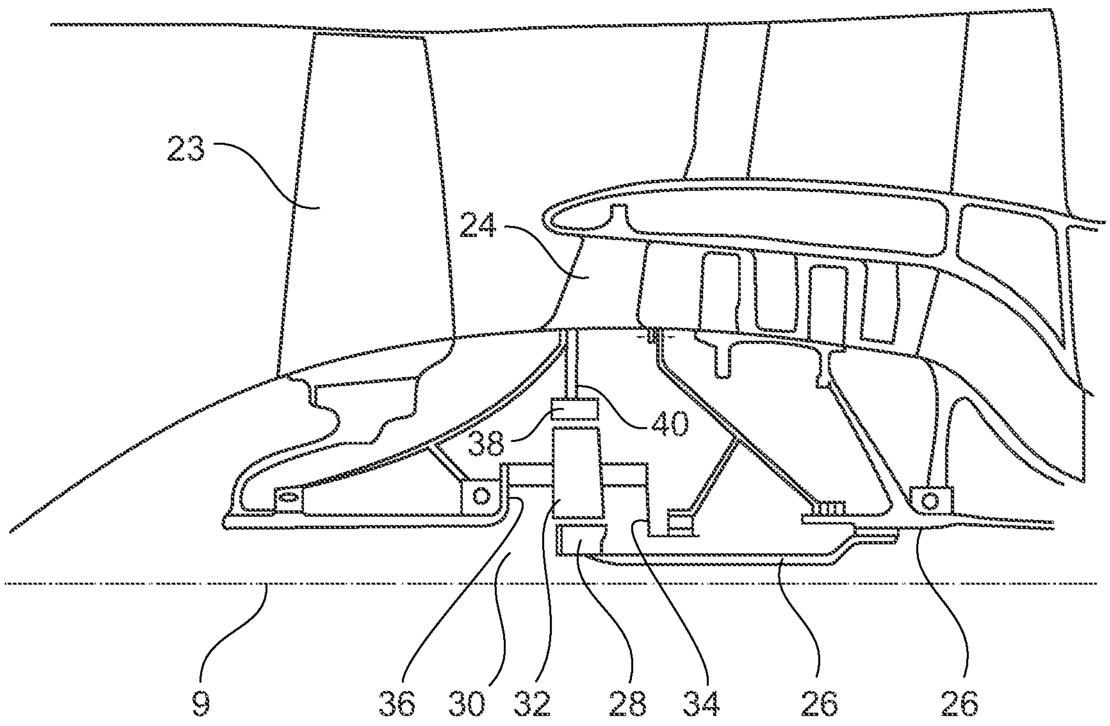
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
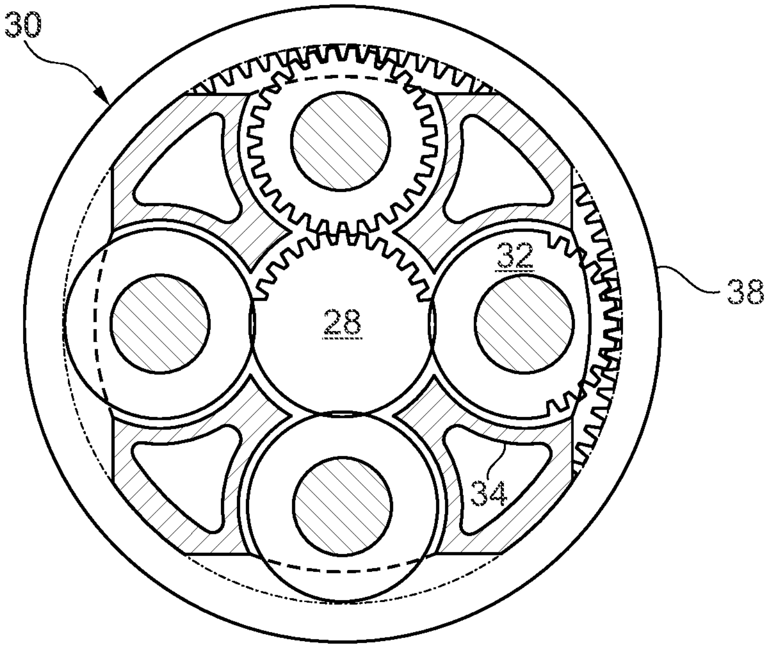
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
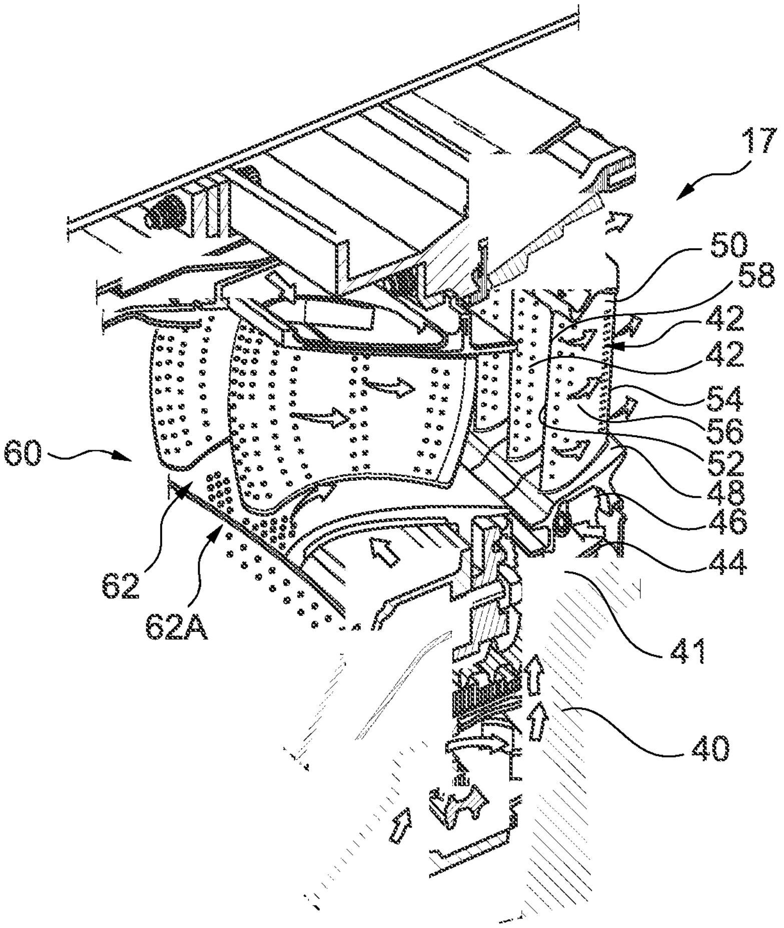
FIG. 4 is an enlarged cut away perspective view of part of a turbine for a gas turbine engine.

FIG. 4 shows part of the high-pressure turbine 17 of the gas turbine engine 10. The high-pressure turbine 17 comprises a turbine disc 40 which carries a plurality of circumferentially spaced radially outwardly extending turbine blades 42. Each turbine blade 42 comprises a root 44, a shank, 46, a platform 48 and an aerofoil 50. The aerofoil 50 of each turbine blade 42 comprises a leading edge 52, a trailing edge 54, a convex surface 56 which extends from the leading edge 52 to the trailing edge 54 and from the platform 48 and a concave surface 58 which extends from the leading edge 52 to the trailing edge 54 and from the platform 48. The root 44 of each turbine blade 42 locates in a slot 41 in the rim of the turbine disc 40. The root 44 of each turbine blade 42 may be a fir-tree shaped root or a dovetail shaped root and locates in a correspondingly shaped slot 41 in the rim of the turbine disc 40. The turbine blades 42 comprise a metal substrate, for example a superalloy, e.g. a nickel based superalloy, a cobalt based superalloy or an iron based superalloy. The metal substrate of the turbine blades 42 may be a single crystal, a directionally solidified or an equiaxed metal.

Each turbine blade 42 is a ceramic coated metallic article. A first portion of the each turbine blade 42 has a metallic bond coating and a columnar grain ceramic coating on the metallic bond coating and a second portion of each turbine blade 42 has a metallic bond coating and a ceramic coating on the metallic bond coating. The ceramic coating on the second portion is less porous than the columnar grain ceramic coating on the first portion. The ceramic coating on the second portion has the same composition as the ceramic coating on the first portion. The ceramic coating on the first portion may have a different composition to the ceramic coating on the second portion. The first portion of each turbine blade 42 comprises the aerofoil 50, e.g. the gas washed surfaces of the aerofoil 50, and the second portion of the turbine blade 42 comprises the platform 48, e.g. the gas washed surface of the platform 48.

The high-pressure turbine 17 also comprises a stage of turbine nozzle guide vanes 60 which direct hot gases from the combustion equipment 16 into the high-pressure turbine 17. The stage of turbine nozzle guide vanes 60 comprises either a plurality of circumferentially arranged turbine vane segments 62 or a plurality of circumferentially arranged turbine vanes 62A.

Figure 5:
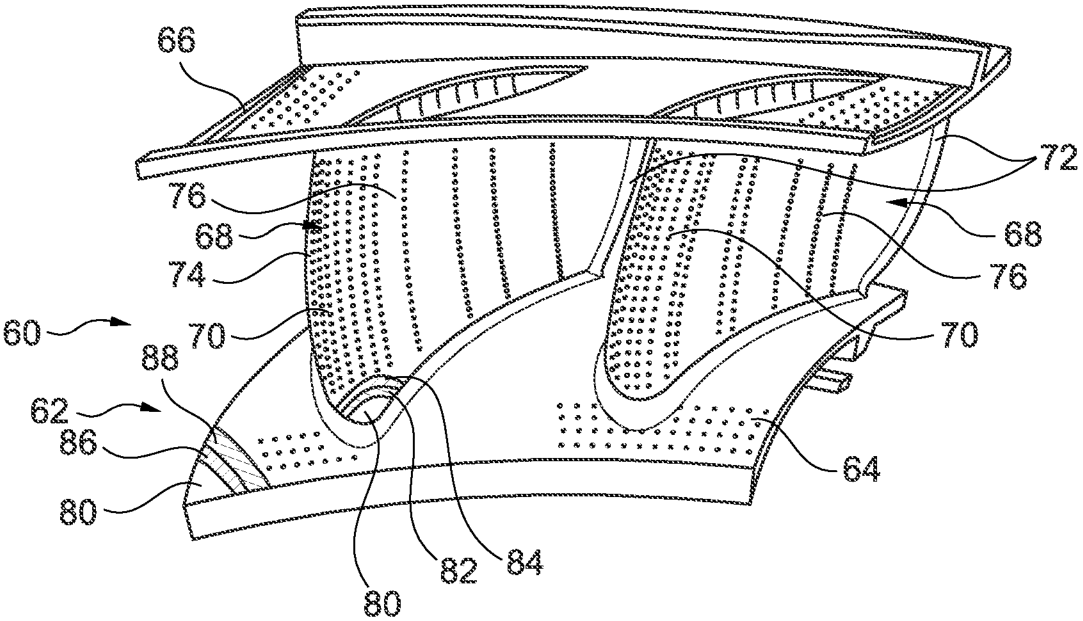
FIG. 5 is a further enlarged perspective view of a turbine vane segment shown in FIG. 4.

FIG. 5 shows a turbine vane segment 62. Each turbine vane segment 62 comprises a first, an inner, platform 64, a second, an outer, platform 66 and a plurality of aerofoils 68 and each aerofoil 68 extends between and is secured to the first and second platforms 64 and 66 respectively. Each aerofoil 68 of the turbine vane segment 62 comprises a leading edge 70, a trailing edge 72, a convex surface 74 which extends from the leading edge 70 to the trailing edge 72 and from the first platform 64 to the second platform 66 and a concave surface 76 which extends from the leading edge 70 to the trailing edge 72 and from the first platform 64 to the second platform 66. In this example each turbine vane segment 62 comprises two aerofoils 68 but each turbine vane segment 62 may have three or more aerofoils 68. The turbine vane segments 62 comprise a metal substrate 80, for example a superalloy, e.g. a nickel based superalloy, a cobalt based superalloy or an iron based superalloy. The metal substrate of the turbine vane segment 62 may be a single crystal, a directionally solidified or an equiaxed metal. Each turbine vane segment 62 is a ceramic coated metallic article.

Each turbine vane segment 62 is a ceramic coated metallic article. A first portion of the each turbine vane segment 62 has a metallic bond coating and a columnar grain ceramic coating on the metallic bond coating and a second portion of each turbine vane segment 62 has a metallic bond coating and a ceramic coating on the metallic bond coating. The ceramic coating on the second portion is less porous than the columnar grain ceramic coating on the first portion. The ceramic coating on the second portion has the same composition as the ceramic coating on the first portion. The ceramic coating on the first portion may have a different composition to the ceramic coating on the second portion. The first portion of each turbine vane segment 62 comprises the aerofoils 68, e.g. the gas washed surfaces of the aerofoils 68, and the second portion of the turbine vane segment 62 comprises the first and second platforms 64 and 66 e.g. the gas washed surfaces of the platform 64 and 66.

Figure 6:
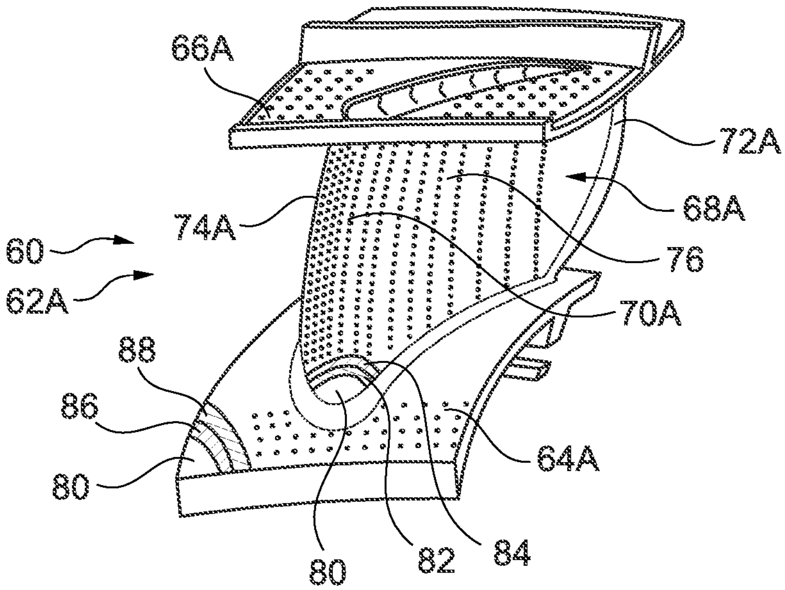
FIG. 6 is a further enlarged perspective view of a turbine vane.

FIG. 6 shows a turbine vane 62A. Each turbine vane 62A comprises a first, an inner, platform 64A, a second, an outer, platform 66A and a single aerofoil 68A which extends between and is secured to the first and second platforms 64A and 66A respectively. The aerofoil 68A of the turbine vane 62A comprises a leading edge 70A, a trailing edge 72A, a convex surface 74A which extends from the leading edge 70A to the trailing edge 72A and from the first platform 64A to the second platform 66A and a concave surface 76A which extends from the leading edge 70A to the trailing edge 72A and from the first platform 64A to the second platform 66A. The turbine vanes 62A comprise a metal substrate 80, for example a superalloy, e.g. a nickel based superalloy, a cobalt based superalloy or an iron based superalloy. The metal substrate of the turbine vane segment 62 may be a single crystal, a directionally solidified or an equiaxed metal. Each turbine vane 62A is a ceramic coated metallic article.

Each turbine vane 62A is a ceramic coated metallic article. A first portion of the each turbine vane 62A has a metallic bond coating and a columnar grain ceramic coating on the metallic bond coating and a second portion of each turbine vane 62A has a metallic bond coating and a ceramic coating on the metallic bond coating. The ceramic coating on the second portion is less porous than the columnar grain ceramic coating on the first portion. The ceramic coating on the second portion has the same composition as the ceramic coating on the first portion. The ceramic coating on the first portion may have a different composition to the ceramic coating on the second portion. The first portion of each turbine vane 62A comprises the aerofoil 68, e.g. the gas washed surfaces of the aerofoil 68, and the second portion of the turbine vane 62A comprises the first and second platforms 64 and 66 e.g. the gas washed surfaces of the platform 64 and 66.

FIGS. 5 and 6 show the metallic bond coating 82 on the first portion and the metallic bond coating 86 on the second portion and in this example they are different, but it is possible the metallic bond coating 82 on the first portion and the metallic bond coating 86 on the second portion are the same. The metallic bond coating 82 on the first portion comprises a platinum-group metal. The metallic bond coating 86 on the second portion is an overlay coating. The overlay coating comprises a MCrAlY coating, a MCrAl coating or a MAl coating, where M is one or more of nickel, cobalt and iron, Cr is chromium, Al is aluminum and Y is one or more of yttrium, ytterbium and lanthanum. The metallic bond coating 86 on the second portion may comprise a layer of platinum-group metal between the second portion of the metallic article and the overlay coating. The layer of platinum-group metal may be deposited by electroplating, or other suitable method, and then may be heat treated to diffuse the platinum-group metal into the metallic article to produce a platinum-group metal enriched outer layer of the metallic article, e.g. a platinum metal enriched outer layer of the metallic article. In the case of a nickel based superalloy, the platinum-group metal enriched outer layer of the metallic article may comprise a platinum-group metal enriched gamma prime phase and a platinum-group metal enriched gamma prime phase, e.g. a platinum enriched gamma prime phase and a platinum enriched gamma prime phase.

FIGS. 5 and 6 show the columnar grain ceramic coating 84 on the metallic bond coating 82 on the first portion and the ceramic coating 88 on the metallic bond coating 86 on the second portion. The columnar grain ceramic coating 84 may have been deposited by physical vapour deposition, e.g. by electron beam physical vapour deposition. The ceramic coating 88 may have been deposited by thermal spraying, e.g. air plasma spraying, vacuum plasma spraying, high-velocity oxy-fuel spraying etc. The ceramic coating may comprise yttria stabilised zirconia. The ceramic coating may comprise zirconia stabilised with ceria, ytterbia or indium. The ceramic coating may comprise zirconia stabilised with yttria and erbia. The ceramic coating may comprise zirconia stabilised with yttria, erbia and gadolinia. The ceramic coating may comprise zirconia stabilised with yttria and gadolinia. The ceramic coating 84 on the first portion and the ceramic coating 88 on the second portion may have the same composition same or they may have a different composition.

Figure 7:
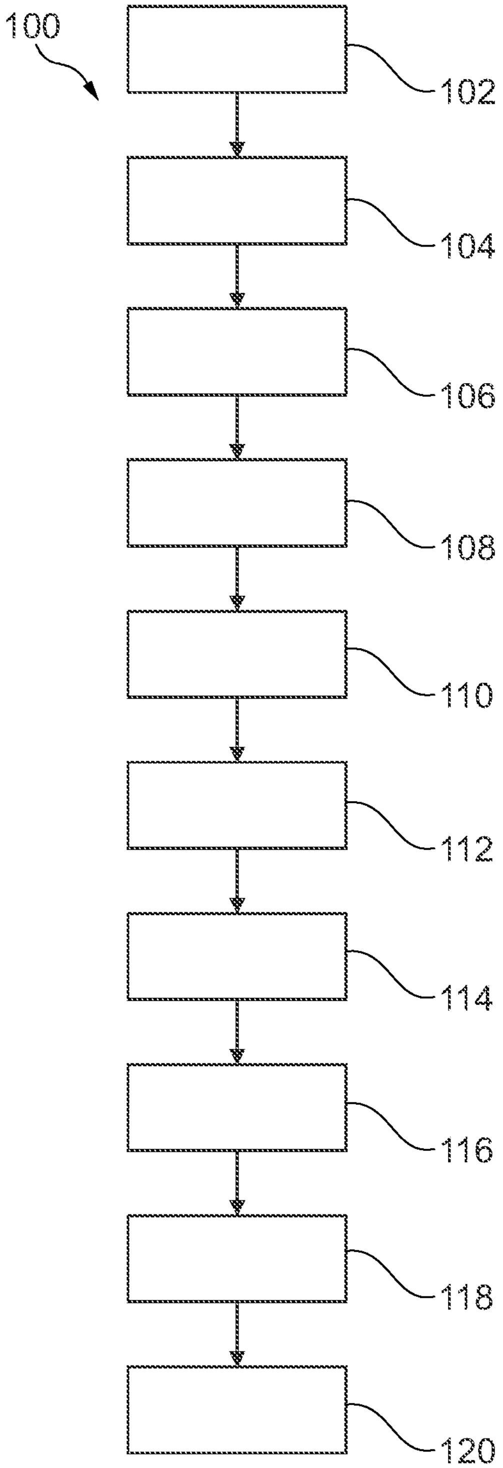
FIG. 7 is a flow chart of a method of removing a ceramic coating from a ceramic coated metallic article according to the present disclosure.

A method of removing a ceramic coating from a ceramic coated metallic article 100 is shown in FIG. 7. The metallic article 42, 62, 62A has a first portion and a second portion, the first portion having a metallic bond coating 82 and a columnar grain ceramic coating 84 on the metallic bond coating 82 and the second portion having a metallic bond coating 86 and a ceramic coating 88 on the metallic bond coating 86, the ceramic coating 88 on the second portion being less porous than the columnar grain ceramic coating 84 on the first portion.

The method of removing a ceramic coating from a ceramic coated metallic article 100 comprises a first step 102 of immersing the ceramic coated metallic article 42, 62, 62A in a caustic solution, the caustic solution comprising one of potassium hydroxide and sodium hydroxide, a second step 104 of maintaining the ceramic coated metallic article in the caustic solution at atmospheric pressure for a predetermined time period and at a predetermined temperature. The first step 102 comprises immersing the ceramic coated metallic article 42, 62, 62A in a caustic solution of 46 to 54% potassium hydroxide or a caustic solution of 46 to 54% sodium hydroxide. The second step 104 comprises maintaining the ceramic coated metallic article 42, 62, 62A in the caustic solution at atmospheric pressure for a time equal to or more than half an hour and equal to or less than one and a half hours at a temperature equal to or greater than 150° C. and equal to or less than 250° C. to weaken a bond between the columnar grain ceramic coating 84 and the metallic bond coating 82 on the first portion of the metallic article 42, 62, 62A. In particular the second step 104 comprises maintaining the ceramic coated metallic article 42, 62, 62A in the caustic solution at atmospheric pressure for a time equal to or less than an hour at a temperature equal to or greater than 200° C. and equal to or less than 220° C. The caustic solution is able to penetrate through the columnar grain ceramic coating 84 on the first portion of the ceramic coated metallic article 42, 62, 62A to remove, or weaken, an alumina layer between the metallic bond coating 82 and the columnar grain ceramic coating 84. The caustic solution is unable to penetrate through the ceramic coating 88 on the second portion of the ceramic coated metallic article 42, 62, 62A. The second step provides sufficient time to allow the caustic solution to penetrate through the columnar grain ceramic coating 84 to weaken an oxide layer between the metallic bond coating 82 and the columnar grain ceramic coating 84 without significant spalling of the columnar grain ceramic coating 84.

A third step 106 of removing the ceramic coated metallic article 42, 62, 62A from the caustic solution and a fourth step 108 of rinsing the ceramic coated metallic article 42, 62, 62A in water at ambient temperature. The fourth step 108 comprises rinsing the ceramic coated metallic article 42, 62, 62A in water for a minimum of 10 minutes. The fourth step 108 of rinsing the ceramic coated metallic article 42, 62, 62A in water at ambient temperature to produce a thermal shock to further weaken the bond between the columnar grain ceramic coating 84 and the metallic bond coating 82 on the first portion of the metallic article 42, 62, 62A.

A fifth step 110 of neutralising the caustic solution with a weak acid and a sixth step 112 of rinsing the ceramic coated metallic article 42, 62, 62A in water. The fifth step 110 comprises neutralising the caustic solution with nitric acid solution with a concentration of 25 to 35% for about 20 minutes, but other suitable acids may be used. The sixth step 112 of rinsing the ceramic coated metallic article 42, 62, 62A in water comprises rinsing in water at ambient temperature for 5 minutes and rinsing in warm water at a temperature equal to or greater than 75° C. and equal to or less than 85° C.

A seventh step 114 of water blasting at mains water pressure to dislodge any debris from the metallic article 42, 62, 62A and an eighth step 116 of rinsing in water. The eighth step 116 comprises rinsing the metallic article 42, 62, 62A in warm water at a temperature equal to or greater than 75° C. and equal to or less than 85° C. for about 5 seconds to dry the metallic article 42, 62, 62A.

A ninth step 118 of water jet blasting the first portion of the metallic article 42, 62, 62A to remove the columnar grain ceramic coating 84, and tenth step 120 of water jet blasting the second portion of the metallic article 42, 62, 62A to remove the ceramic coating 88. The ninth step 118 comprises water jet blasting the first portion of the metallic article 42, 62, 62A by directing water at the columnar grain ceramic coating 84 from a nozzle at a pressure of 275 to 296 MPa (40,000 to 43,000 psi), arranging the nozzle at a stand-off distance from the columnar grain ceramic coating 84 of 25 to 35 mm and traversing the nozzle over the first portion of the metallic article 42, 62, 62A at a speed of 4 to 6 mm per second. In particular the ninth step 118 comprises water jet blasting the first portion of the metallic article 42, 62, 62A by directing water at the columnar grain ceramic coating 84 from a nozzle at a pressure of 284.7 MPa (41,300 psi), arranging the nozzle at a stand-off distance from the columnar grain ceramic coating 84 of 30 mm and traversing the nozzle over the first portion of the metallic article 42, 62, 62A at a speed of 5 mm per second. The tenth step 120 comprises water jet blasting the second portion of the metallic article 42, 62, 62A by directing water at the ceramic coating 88 from a nozzle at a pressure of 275 to 296 MPa (40,000 to 43,000 psi), arranging the nozzle at a stand-off distance from the ceramic coating 88 of 30 to 40 mm and traversing the nozzle over the second portion of the metallic article 42, 62, 62A at a speed of 5 to 8 mm per second. In particular the tenth step 120 comprises water jet blasting the second portion of the metallic article 42, 62, 62A by directing water at the ceramic coating 88 from a nozzle at a pressure of 284.7 MPa (41,300 psi), arranging the nozzle at a stand-off distance from the ceramic coating 88 of 35 mm and traversing the nozzle over the second portion of the metallic article 42, 62, 62A at a speed of 6.7 mm per second.

It is to be noted that the tenth step 120 is performed after the ninth step 118 in order to protect the ceramic coating 88 on the second portion of the metallic article 42, 62, 62A, e.g. to minimise the amount of erosion of the ceramic coating 88 on the second portion of the metallic article 42, 62, 62A. It is also to be noted that the first to tenth steps are performed sequentially one after the other.

In the ninth and/or the tenth steps 118 and 120 the nozzle may be rotated around an axis, which axis, at 1000 rpm+/−100 rpm. In the ninth and/or the tenth steps 118 and 120 the nozzle has an orifice with a diameter of 0.58 mm. In the ninth and/or the tenth steps 118 and 120 the nozzle has a conical fan jet orifice. In the ninth and/or tenth steps 118 and 120 the nozzle is mounted on a six axis robot to enable the nozzle to direct the water onto the ceramic coating 84 and/or 88 on the metallic article 42, 62, 62A. The nozzle may be arranged to direct the water jet at any cooling apertures in the metallic article 42, 62, 62A to remove ceramic coating therefrom.

The ninth and/or tenth steps 118 and 120 comprise directing water droplets with a diameter of 17 to 18 μm onto the columnar grain ceramic coating 84 and the ceramic coating 88 and in particular comprise directing water droplets with a diameter of 17.4 onto the columnar grain ceramic coating 84 and the ceramic coating 88. The ninth and/or tenth steps 118 and 120 comprise directing water droplets with a velocity of 650 $ms^{-1}$ to 690 $ms^{-1}$ onto the columnar grain ceramic coating 84 and the ceramic coating 88. In particular the ninth and/or tenth steps comprise directing water droplets with a velocity of 667 $ms^{-1}$ onto the columnar grain ceramic coating 84 and the ceramic coating 88. The method comprising directing water droplets onto the columnar grain ceramic coating 84 and the ceramic coating 88 to produce an impact pressure of about 1.69 GPa.

We have found that when water droplets with the nominal distribution of 17.4 μm in diameter from the conical fan shaped nozzle impacts the surface of a columnar grain ceramic coating and a lamellae ceramic coating at supersonic velocity of about 667 $ms^{-1}$, it generate an impact pressure of about 1.69 GPa at the interface of the droplet and the ceramic coating. This impact pressure radiates a combination of three stress waves through the ceramic coating; dilatational compression, distortional shear, and surface Rayleigh stress waves. The effect of these stress waves in eroding columnar grain ceramic coatings, e.g. EB-PVD ceramic coatings, and lamellae ceramic coatings, e.g. APS ceramic coatings, differs considerably.

It is postulated that when the compressive waves travels from the surface of the columnar grain ceramic coating 84 towards the base of the columnar grains, it reflects off the oxide, alumina, layer, as tensile waves, which propagate back towards the surface of the columnar grain ceramic coating 84, interacting with the original compression waves. At the same time, the distortional shear waves emanate across the columnar grains and with a surface Rayleigh waves traveling along the surface of the columnar grain ceramic coating 84. The combination effects of these stress wave causes the column grains to crack at an average of 10 μm from the columnar grain ceramic coating 84 free surface. The continuation of this mechanism will eventually lead to complete removal of the columnar grain ceramic coating 84.

It is postulated that the lamellae, or splat-like microstructure, of the APS ceramic coating 88 typically undergo three types of failure mechanisms under the intensity of liquid impact erosion, similar to solid particle erosion. The three types are; splat de-bonding, splat fracture and splat deformation. Splat de-bonding occurs due to the high intensity waterjet impacting on the splat, which has a low cohesive bond. Alternatively, high velocity water droplets penetrating into inter-splat crack boundaries, resulting in the removal of the entire splat. The removal of these splats forms micro-pits on the surface of the ceramic coating 88. These micro-pits act as small steps in the direct path of the outflow water jetting, resulting in a higher APS ceramic coating 88 removal in chips rather than in micro particle erosion.

Figure 8A:
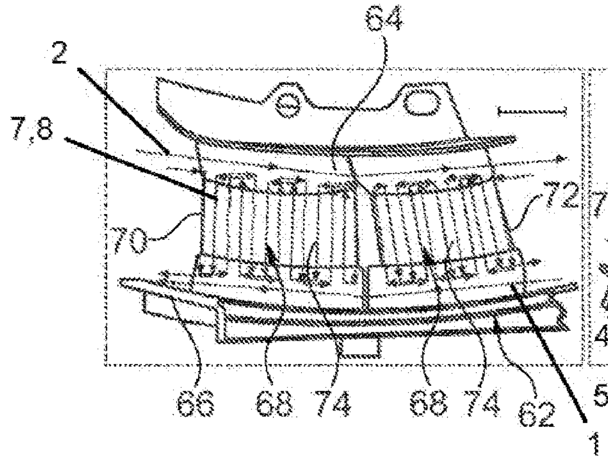
FIG. 8(*a*) is a schematic diagram illustrating the removal of ceramic coating from a convex surface of each aerofoil of a turbine vane segment.
Figure 8B:
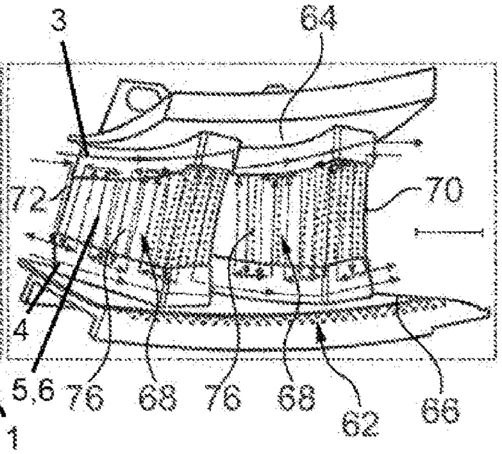
Figure 9A:
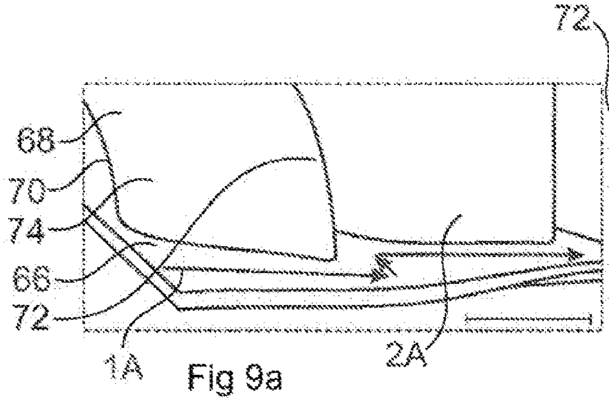
FIG. 9(*a*) is a schematic diagram illustrating the removal of ceramic coating from a surface of an outer platform adjacent to convex surfaces of aerofoils of a turbine vane segment.
Figure 9B:
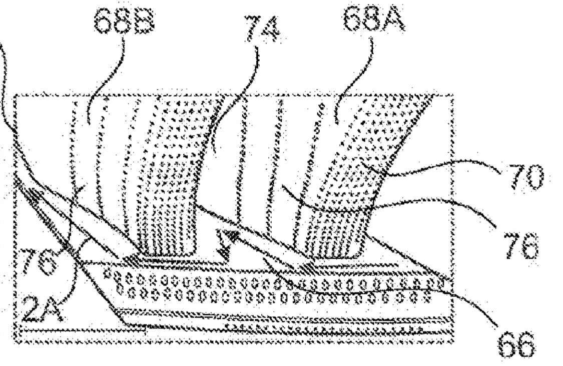
Figure 9C:
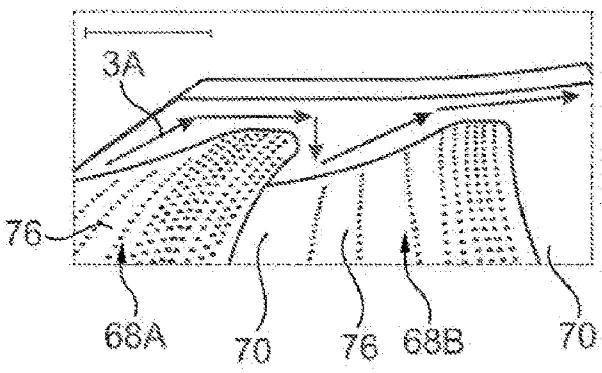
Figure 9D:
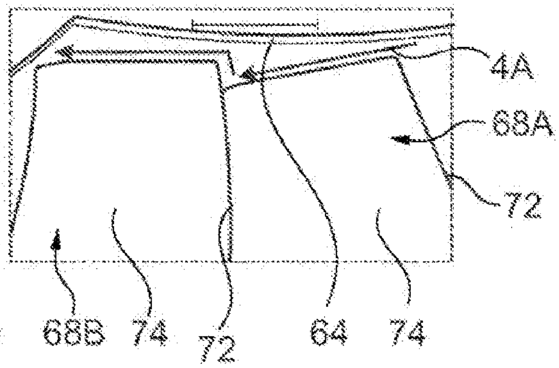

FIGS. 8(*a*) and 8(*b*) show the ninth step of removing the columnar grain ceramic coating 84 from the first portion of the metallic article 42, 62, 62A by water jet blasting the first portion of the metallic article 42, 62, 62A to remove the columnar grain ceramic coating 84.

In particular FIGS. 8(*a*) and 8(*b*) illustrates water jet blasting comprising traversing the nozzle, and hence traversing the water jet, in a first pass 1 over the convex surface 74 of each of the aerofoils 68 of the turbine vane segment 62 from the trailing edge 72 to the leading first edge 70 of each aerofoil 68 adjacent to the radially outer platform 66 and then traversing the nozzle, and hence traversing the water jet, in a second pass 2 over the convex surface 74 of each of the aerofoils 68 of the turbine vane segment 62 from the leading edge 70 to the trailing edge 72 of each aerofoil 68 adjacent to the radially inner platform 64. Then traversing the nozzle, and hence traversing the water jet, in a third pass 3 over the concave surface 76 of each of the aerofoils 68 of the turbine vane segment 62 from the trailing edge 72 to the leading edge 70 of each aerofoil 68 adjacent to the radially inner platform 64 and traversing the nozzle, and hence traversing the water jet, in a fourth pass 4 over the concave surface 76 of each of the aerofoils 68 of the turbine vane segment 62 from the trailing edge 72 to the leading edge 70 of each aerofoil 68 adjacent to the radially outer platform 66. Next traversing 5 and 6 the nozzle, and hence traversing the water jet, repeatedly back and forth, or reciprocating the nozzle, over the concave surface 76 of each aerofoil 68 of the turbine vane segment 62 in a direction between the radially inner and radially outer platforms 64 and 66 between the first pass 3 and the second pass 4 with the back and forth traverses spaced apart in a direction between the leading edge 70 and the trailing edge 72 of each aerofoil 68. Finally, traversing 7 and 8 the nozzle, and hence traversing the water jet, repeatedly back and forth, or reciprocating the nozzle, over the convex surface 74 of each aerofoil 68 of the turbine vane segment 62 in a direction between the radially inner and radially outer platforms 64 and 66 between the first pass 1 and the second pass 2 with the back and forth traverses spaced apart in a direction between the leading edge 70 and the trailing edge 72 of each aerofoil 68.

More generally it is required to have in any order a first pass 1 across the convex surface 74 of each of the aerofoils 68 either from the leading edge 70 to the trailing edge 72 or from the trailing edge 72 to the leading edge 70 adjacent to the radially outer platform 66, a second pass 2 across the convex surface 74 of each of the aerofoils 68 either from the leading edge 70 to the trailing edge 72 or from the trailing edge 72 to the leading edge 70 adjacent to the radially inner platform 64, a third pass 3 across the concave surface 76 of each of the aerofoils 68 either from the leading edge 70 to the trailing edge 72 or from the trailing edge 72 to the leading edge 70 adjacent to the radially inner platform 64, a fourth pass 4 across the concave surface 76 of each of the aerofoils 68 either from the leading edge 70 to the trailing edge 72 or from the trailing edge 72 to the leading edge 70 adjacent to the radially outer platform 64. Once the first, second, third and fourth and passes 1, 2, 3 and 4 have been completed the fifth, sixth, seventh and eighth passes 5, 6, 7 and 8 are performed in any order.

Alternatively, water jet blasting may comprise traversing the nozzle, and hence the water jet, in a first pass 1 over the convex surface 74 of each of the aerofoils 68 of the turbine vane segment 62 from the trailing edge 72 to the leading first edge 70 of each aerofoil 68 adjacent to the radially outer platform 66 and then traversing the nozzle, and hence the water jet, in a second pass 2 over the convex surface 74 of each of the aerofoils 68 of the turbine vane segment 62 from the leading edge 70 to the trailing edge 72 of each aerofoil 68 adjacent to the radially inner platform 64. Then traversing 7 and 8 the nozzle, and hence the water jet, repeatedly back and forth over the convex surface 74 of each aerofoil 68 of the turbine vane segment 62 in a direction between the radially inner and radially outer platforms 64 and 66 between the first pass 1 and the second pass 2 with the back and forth traverses spaced apart in a direction between the leading edge 70 and the trailing edge 72 of each aerofoil 68. Next traversing the nozzle, and hence the water jet, in a third pass 3 over the concave surface 76 of each of the aerofoils 68 of the turbine vane segment 62 from the trailing edge 72 to the leading edge 70 of each aerofoil 68 adjacent to the radially inner platform 64 and traversing the nozzle, and hence the water jet, in a fourth pass 4 over the concave surface 76 of each of the aerofoils 68 of the turbine vane segment 62 from the trailing edge 72 to the leading edge 70 of each aerofoil 68 adjacent to the radially outer platform 66. Finally, traversing 5 and 6 the nozzle, and hence the water jet, repeatedly back and forth over the concave surface 76 of each aerofoil 68 of the turbine vane segment 62 in a direction between the radially inner and radially outer platforms 64 and 66 between the first pass 3 and the second pass 4 with the back and forth traverses spaced apart in a direction between the leading edge 70 and the trailing edge 72 of each aerofoil 68.

More generally it is required to have in any order a first pass 1 across the convex surface 74 of each of the aerofoils 68 either from the leading edge 70 to the trailing edge 72 or from the trailing edge 72 to the leading edge 70 adjacent to the radially outer platform 66, a second pass 2 across the convex surface 74 of each of the aerofoils 68 either from the leading edge 70 to the trailing edge 72 or from the trailing edge 72 to the leading edge 70 adjacent to the radially inner platform 64. Once the first and second passes have been completed the seventh and eighth passes 7 and 8 are performed in any order. Then in any order a third pass 3 across the concave surface 76 of each of the aerofoils 68 either from the leading edge 70 to the trailing edge 72 or from the trailing edge 72 to the leading edge 70 adjacent to the radially inner platform 64, a fourth pass 4 across the concave surface 76 of each of the aerofoils 68 either from the leading edge 70 to the trailing edge 72 or from the trailing edge 72 to the leading edge 70 adjacent to the radially outer platform 64. Once the third and fourth passes 3 and 4 have been completed the fifth and sixth traverses 5 and 6 are performed in any order. In another variation the third and fourth passes 3 and 4 are performed in any order before the fifth and sixth traverses 5 and 6 and then the first and second passes 1 and 2 are performed in any order before the seventh and eighth traverses 7 and 8.

In the fifth, sixth, seventh and eighth passes, 5, 6, 7 and 8, the passes of the nozzle delivering the water jet may be arranged to overlap by 25%.

As mentioned previously the tenth step 120 is performed after the ninth step 118 in order to protect the ceramic coating 88 on the second portion of the metallic article 42, 62, 62A, e.g. to minimise the amount of erosion of the ceramic coating 88 on the second portion of the metallic article 42, 62, 62A. The trajectory of the water jet during the ninth step 118 is designed such that the water jet produces minimal erosion of the ceramic coating 88 such that the ceramic coating 88 masks, e.g. protects, the metallic bond coating 86 on the second portion of the metallic article 42, 62, 62A during the removal of the columnar grain ceramic coating 84 from the first portion of the metallic article 42, 62, 62A.

FIGS. 9(*a*), 9(*b*), 9(*c*) and 9(*d*) show the tenth step of removing the lamellae structure ceramic coating 88 from the second portion of the metallic article 42, 62, 62A by water jet blasting the second portion of the metallic article 42, 62, 62A to remove the lamellae structure ceramic coating 88.

In particular FIGS. 9(*a*), 9(*b*), 9(*c*) and 9(*d*) illustrates water jet blasting comprising traversing the nozzle, and hence the water jet, in a first pass 1A, as shown in FIG. 9(*a*), over the surface of the radially outer platform 66 of the turbine vane segment 62 spaced from the convex surface 74 of each aerofoil 68 in a general direction from the leading edge 70 to the trailing edge 72 of each aerofoil 68. Traversing the nozzle, and hence the water jet, in second pass 2A, as shown in FIG. 9(*b*), over the surface of the radially outer platform 66 parallel to an upstream end of the radially outer platform 66 spaced from the leading edge 70 of a first aerofoil 68A, then back and forth between the concave surface 76 of the first aerofoil 68A and the convex surface 74 of the second aerofoil 68B, then parallel to an upstream end of the radially outer platform 66 spaced from the leading edge 70 of the second aerofoil 68B and then from the leading edge 70 towards the trailing edge 72 of the second aerofoil 68B but spaced from the concave surface 76 of the second aerofoil 68B. Traversing the nozzle, and hence the water jet, in a third pass 3A, as shown in FIG. 9(*c*), over the surface of the radially outer platform 66 from the trailing edge 72 towards the leading edge 70 of the first aerofoil 68A but spaced from the concave surface 76 of the first aerofoil 68A, then parallel to the upstream end of the radially outer platform 66 spaced from the leading edge 70 of the first aerofoil 68A, then around the leading edge 70 of the first aerofoil 68A and back and forth between the convex surface 74 of the first aerofoil 68A and the concave surface 76 of the second aerofoil 68B, then parallel to the upstream end of the radially inner platform 64 adjacent to but spaced from the leading edge 70 of the second aerofoil 68B. Traversing the nozzle, and hence the water jet, in a fourth pass 4A, as shown in FIG. 9(*d*), over the surface of the radially inner platform 64 from the trailing edge 72 of the first aerofoil 68A towards the leading edge 70 of the first aerofoil 68A but spaced from the convex surface 64 of the first aerofoil 68A, around and spaced from the trailing edge 72 of the second aerofoil 68B and from the trailing edge 72 of the second aerofoil 68A towards the leading edge 70 of the second aerofoil 68B but spaced from the convex surface 74 of the second aerofoil 68B.

In general the passes 1A, 2A, 3A and 4A may be performed in any order and each one of passes 1A, 2A, 3A and 4A may be performed in the reverse direction.

Although the present disclosure has referred to a columnar grain ceramic coating on a metallic bond coating on a first portion of the metallic article and a lamellae structure ceramic coating on a metallic bond coating on a second portion of the metallic article it is also applicable to other ceramic coatings on the first and second portions of a metallic article in which the microstructures of the ceramic coatings on the first and second portions of the metallic article are different such that the ceramic coating on the second portion of the metallic article is less porous than the ceramic coating on the first portion of the metallic article.

The advantage of the present disclosure is that it enables a columnar grain ceramic coating and a lamellae structure ceramic coating to be removed from a metallic article without damaging the metallic bond coating under the columnar grain ceramic coating and without damaging the metallic bond coating under the lamellae structure ceramic coating, e.g. without reducing the surface roughness of the metallic bond coating under the lamellae structure ceramic coating. This enables a replacement columnar grain ceramic coating and a replacement lamellae structure ceramic coating to be re-applied to the metallic article without the need to repair, or replace, the corresponding metallic bond coating and hence results in a cost saving.

The advantage of the present disclosure is that it enables ceramic coatings with different microstructures, e.g. one ceramic coating is less porous than the other, to be removed from a metallic article without damaging the metallic bond coating under each of the ceramic coatings. This enables replacement ceramic coatings to be re-applied to the metallic article without the need to repair, or replace, the corresponding metallic bond coating and hence results in a cost saving.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of removing a ceramic coating from a ceramic coated metallic article, the metallic article having a first portion and a second portion, the first portion having a first metallic bond coating and a columnar grain ceramic coating applied to an oxide layer on the first metallic bond coating, and the second portion having a second metallic bond coating and a lamellae ceramic coating applied to a rough surface on the second metallic bond coating, the method comprising the steps of:

a) immersing the ceramic coated metallic article in a caustic solution, the caustic solution comprising one of potassium hydroxide and sodium hydroxide;

b) maintaining the ceramic coated metallic article in the caustic solution at atmospheric pressure for a predetermined time period and at a predetermined temperature;

c) removing the ceramic coated metallic article from the caustic solution;

d) rinsing the ceramic coated metallic article in water at ambient temperature;

e) water jet blasting the first portion of the ceramic coated metallic article to remove the columnar grain ceramic coating by directing water at the columnar grain ceramic coating from a nozzle at a pressure of 275 to 296 MPa (40,000 to 43,000 psi), arranging the nozzle at a stand-off distance from the columnar grain ceramic coating of 25 to 35 mm and traversing the nozzle over the first portion of the metallic article at a speed of 4 to 6 mm per second; and f) water jet blasting the second portion of the ceramic coated metallic article to remove the lamellae ceramic coating by directing water at the lamellae ceramic coating from the nozzle at a pressure of 275 to 296 MPa (40,000 to 43,000 psi), arranging the nozzle at a stand-off distance from the lamellae ceramic coating of 30 to 40 mm and traversing the nozzle over the second portion of the metallic article at a speed of 5 to 8 mm per second, wherein the first portion and the columnar grain ceramic coating are located separately from the second portion and the lamellae ceramic coating, and wherein the water jet blasting of the second portion is carried out after the water jet blasting of the first portion so as to minimize erosion of the lamellae ceramic coating from stress waves.

2. The method of claim 1, wherein the caustic solution is 46 to 54% potassium hydroxide or 46 to 54% sodium hydroxide.

3. The method of claim 1, wherein step b) comprises maintaining the ceramic coated metallic article at atmospheric pressure in the caustic solution for at least one hour at a temperature of 200° C. to 220° C.

4. The method of claim 1, wherein step d) comprises rinsing the ceramic coated metallic article in water for a minimum of 10 minutes.

5. The method of claim 1, wherein step e) comprises water jet blasting the first portion of the metallic article by directing water at the columnar grain ceramic coating from the nozzle at a pressure of 275 to 290 MPa (40,000 to 42,000 psi), arranging the nozzle at a stand-off distance from the columnar grain ceramic coating of the first portion of 28 to 32 mm and traversing the nozzle over the first portion of the metallic article at a speed of 4.5 to 5.5 mm per second.

6. The method of claim 1, wherein step e) comprises water jet blasting the first portion of the metallic article by directing water at the columnar grain ceramic coating from the nozzle at a pressure of 284.7 MPa (41,300 psi), arranging the nozzle at a stand-off distance from the columnar grain ceramic coating of the first portion of 30 mm and traversing the nozzle over the first portion of the metallic article at a speed of 5 mm per second.

7. The method of claim 1, wherein step f) comprises water jet blasting the second portion of the metallic article by directing water at the lamellae ceramic coating from the nozzle at a pressure of 275 to 290 MPa (40,000 to 42,000 psi), arranging the nozzle at a stand-off distance from the lamellae ceramic coating of the second portion of 33 to 37 mm and traversing the nozzle over the second portion of the metallic article at a speed of 6 to 7 mm per second.

8. The method of claim 1, wherein step f) comprises water jet blasting the second portion of the metallic article by directing water at the lamellae ceramic coating from the nozzle at a pressure of 284.7 MPa (41,300 psi), arranging the nozzle at a stand-off distance from the lamellae ceramic coating of the second portion of 35 mm and traversing the nozzle over the second portion of the metallic article at a speed of 6.7 mm per second.

9. The method of claim 1, wherein the ceramic coated metallic article is selected from a group consisting of:

a turbine blade comprising a root, a shank, a platform and an aerofoil;

a turbine vane comprising a first platform, a second platform and an aerofoil extending between and secured to the first and second platforms of the turbine vane; and a turbine vane segment comprising a first platform, a second platform and a plurality of aerofoils, each aerofoil extending between and secured to the first and second platforms of the turbine vane segment.

10. The method of claim 9, wherein the ceramic coated metallic article is the turbine blade, the first portion of the metallic article comprises the aerofoil of the turbine blade and the second portion of the metallic article comprises the platform of the turbine blade.

11. The method of claim 9, wherein the ceramic coated metallic article is the turbine vane, the first portion of the metallic article comprises the aerofoil of the turbine vane and the second portion of the metallic article comprises the first and second platforms of the turbine vane, and wherein step e) comprises traversing the nozzle in a first pass over a concave surface of the aerofoil of the turbine vane from a first edge to a second edge of the aerofoil adjacent to the first platform of the turbine vane, traversing the nozzle in a second pass over the concave surface of the aerofoil of the turbine vane from the second edge to the first edge of the aerofoil adjacent to the second platform of the turbine vane, traversing the nozzle repeatedly back and forth over the concave surface of the aerofoil of the turbine vane in a direction between the first and second platforms between the first pass and the second pass with the back and forth traverses spaced apart in a direction between the first edge and the second edge of the aerofoil.

12. The method of claim 9, wherein the ceramic coated metallic article is the turbine vane, the first portion of the metallic article comprises the aerofoil of the turbine vane and the second portion of the metallic article comprises the first and second platforms of the turbine vane, and wherein step e) comprises traversing the nozzle in a first pass over a convex surface of the aerofoil of the turbine vane from a first edge to a second edge of the aerofoil adjacent to the first platform of the turbine vane, traversing the nozzle in a second pass over the convex surface of the aerofoil of the turbine vane from the second edge to the first edge of the aerofoil adjacent to the second platform of the turbine vane, traversing the nozzle repeatedly back and forth over the convex surface of the aerofoil of the turbine vane in a direction between the first and second platforms between the first pass and the second pass with the back and forth traverses spaced apart in a direction between the first edge and the second edge of the aerofoil.

13. The method of claim 9, wherein the ceramic coated metallic article is the turbine vane segment, the first portion of the metallic article comprises the plurality of aerofoils of the turbine vane segment and the second portion of the metallic article comprises the first and second platforms of the turbine vane segment, and wherein step e) comprises traversing the nozzle in a first pass over a concave surface of each aerofoil of the turbine vane segment from a second edge to a first edge of each aerofoil adjacent to the first platform of the turbine vane segment, traversing the nozzle in a second pass over the concave surface of each aerofoil of the turbine vane segment from the second edge to the first edge of each aerofoil adjacent to the second platform of the turbine vane segment, traversing the nozzle repeatedly back and forth over the concave surface of each aerofoil of the turbine vane segment in a direction between the first and second platforms between the first pass and the second pass with the back and forth traverses spaced apart in a direction between the first edge and the second edge of each aerofoil.

14. The method of claim 9, wherein the ceramic coated metallic article is the turbine vane segment, the first portion of the metallic article comprises the plurality of aerofoils of the turbine vane segment and the second portion of the metallic article comprises the first and second platforms of the turbine vane segment, and wherein step e) comprises traversing the nozzle in a first pass over a convex surface of each aerofoil of the turbine vane segment from a second edge to a first edge of each aerofoil adjacent to the first platform of the turbine vane segment, traversing the nozzle in a second pass over the convex surface of each aerofoil of the turbine vane segment from the second edge to the first edge of each aerofoil adjacent to the second platform of the turbine vane segment, traversing the nozzle repeatedly back and forth over the convex surface of each aerofoil of the turbine vane segment in a direction between the first and second platforms between the first pass and the second pass with the back and forth traverses spaced apart in a direction between the first edge and the second edge of each aerofoil.

15. The method of claim 9, wherein the ceramic coated metallic article is the turbine vane segment, the first portion of the metallic article comprises the plurality of aerofoils of the turbine vane segment and the second portion of the metallic article comprises the first and second platforms of the turbine vane segment, and wherein step e) comprises traversing the nozzle in a first pass over a concave surface of each aerofoil of the turbine vane segment from a trailing edge to a leading edge of each aerofoil adjacent to the first platform of the turbine vane segment, traversing the nozzle in a second pass over the concave surface of each aerofoil of the turbine vane segment from the trailing edge to the leading edge of each aerofoil adjacent to the second platform of the turbine vane segment, traversing the nozzle repeatedly back and forth over the concave surface of each aerofoil of the turbine vane segment in a direction between the first and second platforms between the first pass and the second pass with the back and forth traverses spaced apart in a direction between the leading edge and the trailing edge of each aerofoil.

16. The method of claim 9, wherein the ceramic coated metallic article is the turbine vane segment, the first portion of the metallic article comprises the plurality of aerofoils of the turbine vane segment and the second portion of the metallic article comprises the first and second platforms of the turbine vane segment, and wherein step e) comprises traversing the nozzle in a first pass over a convex surface of each aerofoil of the turbine vane segment from a trailing edge to a leading edge of each aerofoil adjacent to the first platform of the turbine vane segment, traversing the nozzle in a second pass over the convex surface of each aerofoil of the turbine vane segment from the trailing edge to the leading edge of each aerofoil adjacent to the second platform of the turbine vane segment, traversing the nozzle repeatedly back and forth over the convex surface of each aerofoil of the turbine vane segment in a direction between the first and second platforms between the first pass and the second pass with the back and forth traverses spaced apart in a direction between the leading edge and the trailing edge of each aerofoil.

17. The method of claim 1, comprising rotating the nozzle at 1000 rpm+/−100 rpm and the nozzle having a diameter of 0.58 mm.

18. The method of claim 11, comprising arranging the passes of the nozzle to overlap by 25%.

19. The method of claim 1, further comprising:

neutralizing the caustic solution with an acid after removing the ceramic coated metallic article from the caustic solution and before rinsing the ceramic coated metallic article in water at ambient temperature.

* * * * *